(No Model.)

C. J. ROBINSON & T. BIRKS.
APPARATUS FOR SEPARATING MOISTURE FROM GRAIN.

No. 584,195. Patented June 8, 1897.

Witnesses
Thos. Whitworth
H. F. Rawbone

Inventors
Charles John Robinson
Thomas Birks

UNITED STATES PATENT OFFICE.

CHARLES JOHN ROBINSON AND THOMAS BIRKS, OF ROCHDALE, ENGLAND.

APPARATUS FOR SEPARATING MOISTURE FROM GRAIN.

SPECIFICATION forming part of Letters Patent No. 584,195, dated June 8, 1897.

Application filed February 25, 1896. Serial No. 580,738. (No model.)

*To all whom it may concern:*

Be it known that we, CHARLES JOHN ROBINSON and THOMAS BIRKS, subjects of the Queen of Great Britain, residing at Rochdale, in the county of Lancaster, England, have invented a new and useful Improvement in Apparatus for Separating Moisture from Grain, of which the following is a specification.

The main object is to provide simple and efficient apparatus for removing adhering or surface moisture from washed, damped, or wetted grain without subjecting the said grain to undue friction or rubbing off the outer skin or cuticle.

Figure 1:
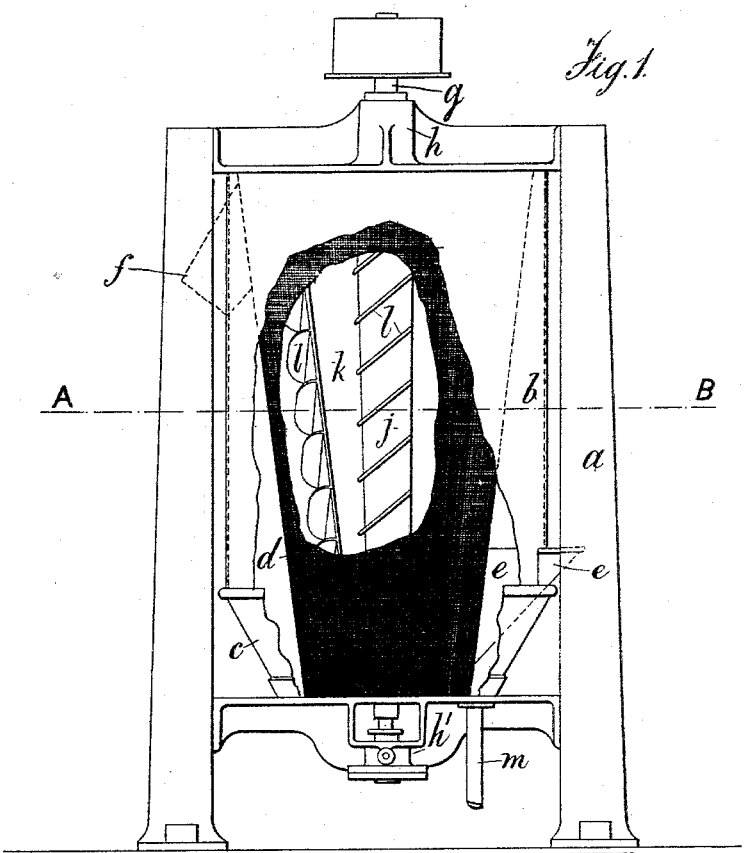
Figure 2:
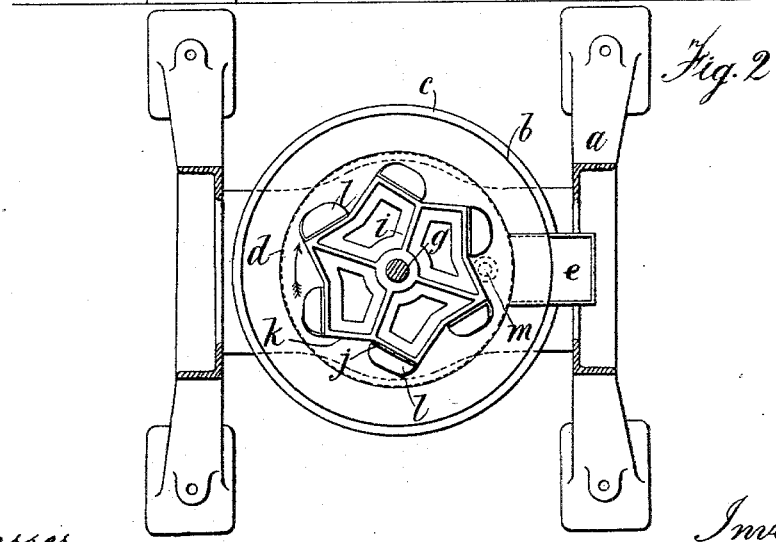

Figure 1 is an elevation, parts being removed, and Fig. 2 is a horizontal section at the line A B, of apparatus constructed in accordance with our invention.

$a$ is the framework, which carries a sheet-metal or other suitable case $b$, closed at the top and terminating at its lower end in a basin or trough $c$. Within the case $b$ and basin or trough $c$ is a conical container of woven wire, perforated metal, or like open-work material $d$, the wider end of the said container being above.

$e$ is a way passing through the case $b$ into the lower end of the container $d$.

$f$ is a way leading from the top of the container $d$ down through the case $b$. Within the container $d$ is a shaft $g$, free to rotate in bearings $h\ h'$ in the frame $a$. The said shaft $g$ is fitted with a conical star-shaped drum or device $i$, having advancing faces $j$ and retiring faces $k$. The advancing faces $j$ each carry a series of semicircular blades $l$. Each blade is set at an angle, so as to rise from front to rear of the face, and the top edge of a lower blade is at about the same level as the bottom edge of the blade above. The drum or device $i$ rotates in the direction of the arrow. The interior face of the container $d$ should be smooth, so as not to abrade the grain.

The moist grain is fed into the apparatus through the way $e$, where it is struck by the advancing faces $j$ and thrown against the inner surface of the perforated container $d$, from which it rebounds into the spaces formed by the retiring faces $k$, which gather it together, so as to be caught by the inclined blades $l$, which raise the said grain to the advancing faces $j$. The faces $j$ again fling the grain against the inner surface of the container $d$ and the operation is repeated until the grain reaches the top and is thrown out through the way $f$. Each time the grain comes in contact with the inner surface of the container $d$ some of the adhering moisture flies through the perforations and falls or trickles down into the basin or trough $c$, whence it is run off through a suitable opening $m$. In this way the grain is practically freed from adhering moisture when it descends the way $f$. Owing to the perforated container $d$ being of larger diameter above, the water passing through the perforations cannot again enter the chamber. The blades being within the reëntrant angles lift the grain within the angles, while the angles themselves throw the grain outwardly against the case. The reëntrant angles also collect the grain upon and feed it to the lifting-blades.

We claim—

In grain-drying apparatus, the combination with a downwardly-tapering perforated container having a feed-inlet at its lower end, of a vertical downwardly-tapering polygonal drum having a solid or continuous surface composed of sides forming reëntrant angles, and inclined lifting-blades projecting from one face of each of these reëntrant angles; substantially as described.

In testimony whereof we have hereunto set our hands this 11th day of February, 1896.

CHARLES JOHN ROBINSON.
THOMAS BIRKS.

Witnesses:
THOS. WHITWORTH,
W. T. RAWBONE.